(12) United States Patent
Boivin et al.

(10) Patent No.: US 6,459,826 B1
(45) Date of Patent: Oct. 1, 2002

(54) PROGRAMMABLE OPTICAL SWITCH APPARATUS

(75) Inventors: Luc Boivin; Jiten Sarathy, both of Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/532,679

(22) Filed: Mar. 21, 2000

(51) Int. Cl.$^7$ .............................. G02B 6/27; H04J 14/06
(52) U.S. Cl. .............................. 385/11; 385/24; 359/122
(58) Field of Search ...................... 385/24, 11; 359/115, 359/122, 124–134, 175, 156

(56) References Cited

U.S. PATENT DOCUMENTS

| | | | | |
|---|---|---|---|---|
| 4,758,070 A | * | 7/1988 | Nishimoto | 359/316 |
| 5,052,051 A | * | 9/1991 | Naito et al. | 359/192 |
| 5,754,321 A | * | 5/1998 | Giles et al. | 359/115 |
| 6,130,766 A | * | 10/2000 | Cao | 359/122 |
| 6,271,952 B1 | * | 8/2001 | Epworth | 359/140 |
| 6,285,478 B1 | * | 9/2001 | Liu et al. | 359/122 |

FOREIGN PATENT DOCUMENTS

WO        WO 94/21059        * 9/1994

OTHER PUBLICATIONS

F. Heismann, "Analysis of a reset–free polarization controller for fast automatic polarization stabilization in fiber–optic transmission systems," J. Lightwave Tech., vol. 12, No. 4, pp. 690–699.

* cited by examiner

*Primary Examiner*—Akm E. Ullah
*Assistant Examiner*—Michelle R. Connelly-Cushwa
(74) *Attorney, Agent, or Firm*—John A. Caccuro

(57) ABSTRACT

An optical switch comprises a programmable optical polarization unit (POLCON) which receives an input optical signal and selects an output signal polarization in response to a control signal. A polarization beam splitter (PBS) splits the selected polarization signal from the POLCON into a first and second orthogonally polarized signals. A feedback circuit couples a feedback signal indicative of the optical signal strength of at least one of the orthogonally polarized signals back to the POLCON which uses it to adjust the output signal polarization. The optical switch may be used with input optical signals having fixed or varying polarizations by utilizing a single or two feedback signals, respectively. The optical switch may be used as an optical Add/Drop unit or incorporated as part of a wavelength division multiplexed (WDM) signal Add/Drop unit.

13 Claims, 3 Drawing Sheets

PROGRAMMABLE OPTICAL SWITCH APPARATUS

TECHNICAL FIELD OF THE INVENTION

This invention relates to an optical switch apparatus for use with Wavelength Division Multiplex (WDM) signals and, more particularly, to a programmable optical switch apparatus implemented using a controllable optical polarization unit.

BACKGROUND OF THE INVENTION

The architecture of a programmable add/drop node 100 is shown in FIG. 1. In this scheme, all the WDM signal channels 101 of the system are demultiplexed in demultiplexer 102. Following this, some of the wavelength channels continue through 103 the add/drop node while other wavelength channels can be dropped or added by add/drop switches 104. Finally, all the signal channels are multiplexed together by multiplexer 105 to form WDM signal 106 which is passed on to an optical line system (OLS). Within the node 100, add/drop switches 104 can be installed one channel at a time. In this manner scaling of the number of add/drop channels can be achieved at node 100 without complete disruption of service. Also, any add/drop switch can be reconfigured in response to a local or remote control signal 107 to change a signal channel from a drop to a through state or vice-versa. Consequently, a modular remotely re-configurable switch is advantageous for such an add/drop architecture.

A potential problem of this add/drop architecture is in-band crosstalk. It is well known that in-band crosstalk causes severe performance penalties at the receiver in an optical network. [1,2] (Note in this specification, a reference to another document is designated by a number in brackets to identify its location in a list of references found in the Appendix) In-band crosstalk refers to those optical fields that can interfere at a receiver with the signal field to produce spectral beat frequencies which are within the receiver bandwidth. When optical add/drop architectures such as the illustration in FIG. 1 are used in the network, in-band crosstalk can occur in two ways. First, limitations of out-of-passband extinction of the demultiplexer 102 leads to multi-path interference of the signal with itself at the output of the multiplexer 105 of FIG. 1. While this contribution to in-band crosstalk penalty increases with the number of wavelength channels, the crosstalk level can be low due to a second rejection at the multiplexer 105. Pires et al. [3] show that a rejection of more than 35dB is required at the demultiplexer in a full mesh WDM ring network in order to sustain nine nodes. Second, in the event of wavelength reuse the added signal channel suffers in-band crosstalk penalty at its receiver due to incomplete extinction of the drop-channel (leak-through) 108 at the switches as shown by 109 in FIG. 1. The leak-through field 109 of the dropped channel interferes with the added signal field 110 since the spectra of both the added and dropped signal channels are nominally centered at the same wavelength. We have previously measured the in-band crosstalk penalties due to the second mechanism for different data rates and determined that the drop-channel must be suppressed by 32–35 dB to ensure that the in-band crosstalk penalty is less than 1 dB independent of the granularity of the optical network.

Thus, there is a continuing need to reduce the in-band crosstalk penalty in Add/Drop apparatuses.

SUMMARY OF THE INVENTION

In accordance with the apparatus and operating method of the present invention, we disclose an optical switch that eliminates the second type of in-band crosstalk penalty by ensuring that the polarization of an added signal is cross-polarized with respect to the leak-through optical field of a dropped signal. In the event of cross-polarization, there is no interference between the added signal and the leak-through at the receiver. In this case, the leak-through only contributes to non-signal received power which leads to far smaller power penalties. The task of cross-polarizing the added signal is complicated by the randomness of the polarization of leak-through signal. Since the dropped signal originates at a different part of the optical network, its polarization changes with time due to a number of environmental factors. In our optical switch, we provide a feedback signal which controls a polarization rotator [4] to maintain the drop channel field in a fixed state of linear polarization, thereby minimizing any leak-through signal. Thus, our optical switch provides the advantage of eliminating in-band crosstalk power penalties arising from interference between the optical fields of the added signal channel and the leaked-through drop signal channel. Moreover, our optical switch is a modular, remotely re-configurable switch which may be used in a wavelength add/drop node of FIG. 1 to perform three required functions—namely continue-no drop, drop and continue, and drop/add.

More generally, our invention is directed to an optical switch apparatus comprising (1) a programmable optical polarization unit for receiving an input optical signal and for selecting the polarization of an output signal in response to a control signal; (2) a polarization beam splitter (PBS) for splitting the selected polarization output signal from the OSP unit into a first and second orthogonally polarized signals; (3) a feedback circuit for coupling a feedback signal indicative of the optical signal strength of at least one of the orthogonally polarized signals back to the programmable optical polarization unit; and (4) wherein the programmable optical polarization unit adjusts its rotation, in response to the feedback signal, to maintain a fixed polarization of the selected polarization output signal.

In accordance with other aspects of the invention, the optical switch apparatus may be incorporated as part of an optical Add/Drop unit or a wavelength division multiplexed (WDM) signal Add/Drop unit. The optical switch apparatus may be used with input optical signals having fixed or varying polarizations by utilizing a single or two feedback signals, respectively. The optical switch apparatus also be implemented using a variety of polarization beam splitters.

BRIEF DESCRIPTION OF THE DRAWINGS

In the drawings.

In the following description, identical element designations in different figures represent identical elements. Additionally in the element designations, the first digit refers to the figure in which that element is first located (e.g., 102 is first located in FIG. 1).

DETAILED DESCRIPTION

Figure 1:
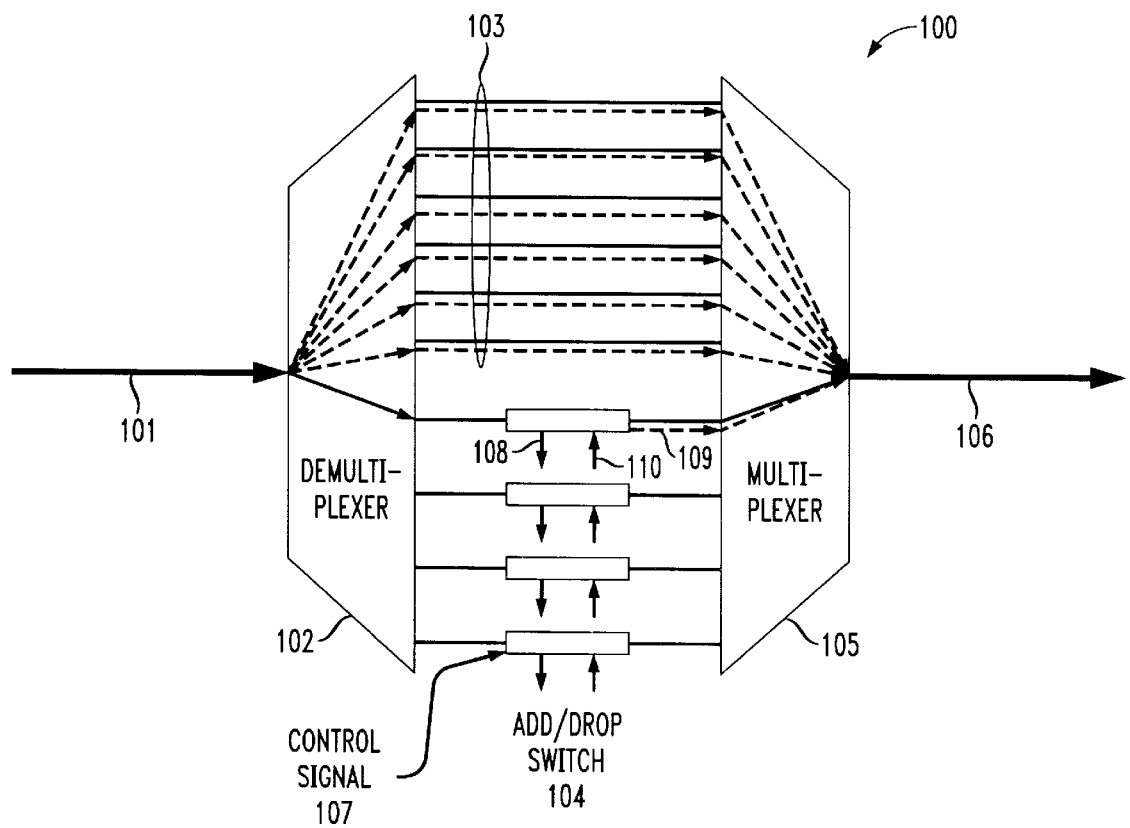
FIG. 1 shows, in accordance with the present invention, an illustrative block diagram of a programmable Add/Drop node for use with wavelength division multiplex (WDM) signals.

Shown in FIG. 1 is an illustrative block diagram of a programmable Add/Drop node 100 for use with wavelength division multiplex (WDM) signals. The Add/Drop node 100 includes one or more Add/Drop switches 104 each of which is programmable under control of control signal 107 to Drop, Drop and Continue, Add, or Continue (i.e., pass) one or more wavelengths from a received WDM signal 101 to form the output WDM signal 106.

Figure 2:
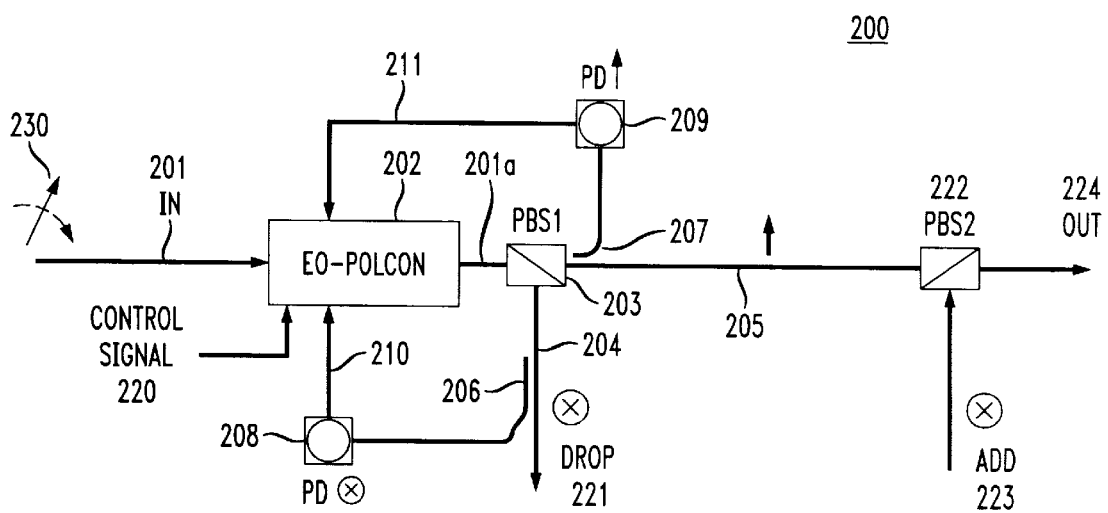
FIG. 2 shows, illustratively, a first embodiment of an Add/Drop optical switch which may be used in the Add/Drop node of FIG. 1 for controlling the Add/Drop/Continue capability for one wavelength.

FIG. 2 shows, illustratively, a first embodiment of an Add/Drop switch apparatus 200 which may be used with the Add/Drop node 100 of FIG. 1 for controlling the Add/Drop/Continue capability for one or more wavelengths. The Add/Drop switch apparatus 200 includes an electro-optic polarization controller (POLCON) 202 which receives an input optical wavelength signal 201 (e.g., from demultiplexer 102) and rotates the polarization of the optical field of input signal 201 to the desired polarization at output 201a. As shown, the polarization 230 of the optical field of input signal 201 can be any type and may vary as a function of time. Since the input signal originates at a different part of the optical network, its polarization changes with time due to a number of environmental factors. The variability of the polarization of input signal 201 may be caused, for example, by a variety of environmental factors that affect an optical fiber facility over which the input signal was carried. These environmental factors may include temperature, stress, interference, etc, to which the optical fiber facility is exposed. Generally, the polarization of input signal 201 changes at a 10 to 100 $\mu$sec rate. Such a rate of polarization change, however, can be easily compensated for by our feedback arrangement used with POLCON 202.

The optical output signal 201a of POLCON 202 is divided by first fiber Polarization Beam-Splitter (PBS1) 203 into its constituent orthogonal polarizations, shown as ↑ and ⊗. The state of polarization at each of the two outputs of PBS1, i.e., ↑ and ⊗ are preserved through the use of polarization maintaining (PM) fibers, 205 and 204. The 10% couplers or taps, 206 and 207, on each output path are terminated at photodetectors 208 and 209, respectively. The two photodetectors—PD↑ 209 and PD⊗ 208 monitor the power level of each of the two polarization states in the output signal of PBS1 203. The electrical photocurrents signals 210 and 211, from photodetectors 208 and 209, respectively, are inputs to a control circuit (401 of FIG. 4) of POLCON 202. The ratio of photocurrents signals $I_{PD\uparrow}$ 211, and $I_{PD}\otimes$ 210, gives the state of polarization of the input signal 201a to PBS1 203 independent of the total power in the signal channel. Thus, if the ratio of photocurrents signals 211 to 212 is low the input signal to PBS1 203 has more ⊗ than ↑ polarization. Conversely, if the ratio of photocurrents signals 211 to 210 is high the input signal to PBS1 203 has more ↑ than ⊗ polarization. Two feedback loops are formed in FIG. 2, one formed by PBS1, coupler 206, PD 208, and POLCON 202; and the second formed by PBS1, coupler 207, PD 207, and POLCON 202. The control signal 220 selects whether POLCON 202 is to be in the Drop (and Add), Continue, and Drop and Continue mode and produce, respectively, a ⊗, ↑, or combined ⊗ and ↑ polarized signal outputted from POLCON 202. The feedback signals 210 and 211 enable POLCON 202 to adjust its polarization rotation to compensate for any polarization variation (e.g., 230) in input signal 201 and thus maintain constant the selected polarization of the output signal 201a of POLCON 202.

If the control signal 220 indicates that the input optical signal 201 is to be dropped then POLCON 202 produces a ⊗ polarized signal which PBS1 directs to the Drop port 221. If the control signal 220 indicates that the optical signal 220 is to be passed through (or continued) Add/Drop switch 200, then POLCON 202 produces a ↑ polarized signal which PBS1 directs to fiber 205. Thus, PBS1 203 provides drop functionality to the Add/Drop switch apparatus 200.

The add function is provided by PBS2 222 which receives a ⊗ polarized signal at Add port 223 which is combined with any ↑ polarized signal on fiber 205 to produce the output signal 224. Note, the ↑ polarized signal exists, for example, when control signal 220 selects that POLCON 202 is to be in the Drop and Continue mode (where both the ↑ and ⊗ polarized signals are present in signal 201a). The output signal 224 of PBS2 is then multiplexed with the other signal channels by multiplexer 105 to form the WDM signal 106. The above-described polarization beam splitters, PBS1 and PBS2, may be of a type selected from a group including a prism, a thin glass plate, a partially reflective mirror, a bulk-optic device or other known type.

It should be noted that any two fixed orthogonal linear polarizations—illustratively, represented by ↑ and ⊗—can be set as the two output polarization states of the signal from POLCON 202. While the Continue (or through) mode or state of the switch 200 is assigned the ↑-state of polarization, the Drop/Add mode is assigned the ⊗-state of polarization.

Figure 4:
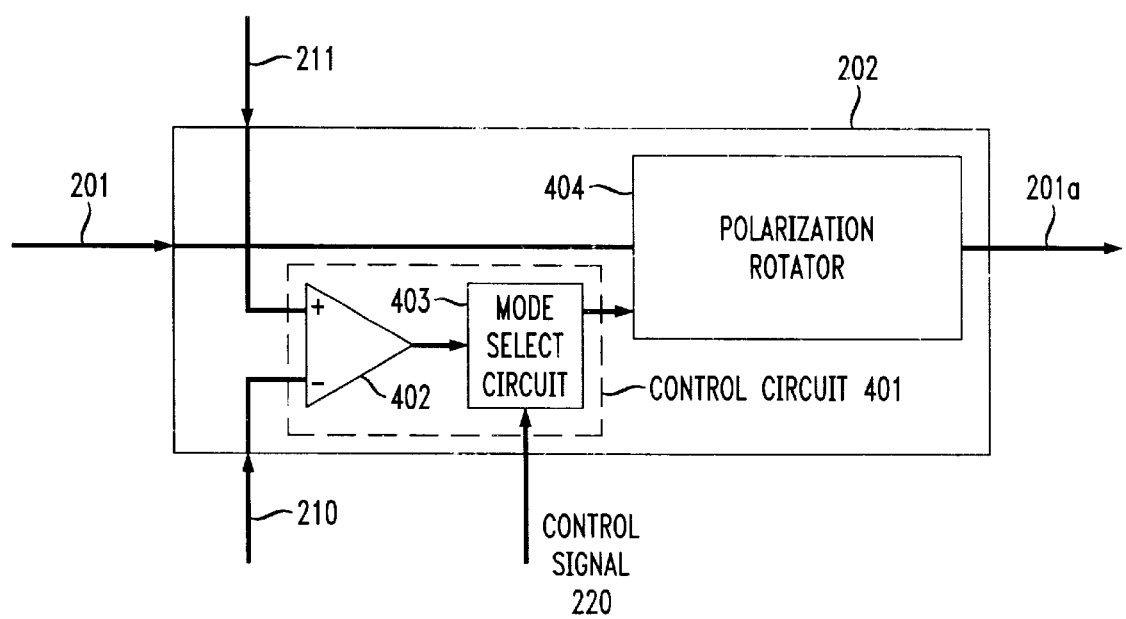
FIG. 4 shows an illustrative block diagram of the electro-optical polarization controller (POLCON) used in the Add/Drop apparatus of FIGS. 2 and 3.

FIG. 4 shows an illustrative block diagram of POLCON 202 used in the Add/Drop apparatus of FIG. 2. As shown POLCON 202 includes a control circuit 401 and a polarization rotator 404. The polarization rotator 404 may be a polarization transformer of the type described in U.S. Pat. No. 5,930,414 issued on Jul. 27, 1999 to D. A. Fishman et al, which is incorporated by reference herein. The control circuit 401 includes a difference amplifier 402 which determines the ratio of the two photocurrents 210 and 211. The output of amplifier 402 is fed to a mode select circuit 403 along with the control signal 220. The control signal 220 enables mode select circuit 403 to output the proper voltage needed to select the operating mode of control polarization rotator 404. Depending on particular operating mode selected, control polarization rotator 404 sets the linear state of polarization of its output signal 201a. The control signal 220 thus enables each of the Add/Drop switch 200 functions to be executed as follows:

Continue-no drop mode: This is achieved by ensuring that the feedback sets the output state of the POLCON 202 to the ↑-polarization state. In other words, the ratio $I_{PD\uparrow}/I_{PD}\otimes$ is set to a fixed high value (for example 27 dB). Thus as the polarization of the input signal varies over time, the feedback signals $I_{PD\uparrow}/I_{PD}\otimes$ cause polarization rotator 404 to change its rotation to maintain the polarization of the output signal 201a of POLCON 202 at the ↑-polarization state. The upper limit of this ratio is set by the polarization extinction of the PBS.

Drop-and-continue mode: Depending upon the required extinction between the drop and the through states of the add/drop, the ratio $I_{PD\uparrow}/I_{PD}\otimes$ can be set. The ratio of signal dropped to the signal continued is determined by the particular application. In a multicast application, the drop signal level may be determined by the number of nodes that are to receive the same optical signal.

Drop-and-Add mode: This is achieved by setting the ratio $I_{PD1}/I_{PD}\otimes$ to a fixed low value (for example −27 dB). Since the polarization of the added signal can be fixed and set to the ⊗-state of polarization, it is naturally cross-polarized with the through (↕) polarization state. Thus as the polarization of the input signal varies over time, the feedback signals $I_{PD1}/I_{PD}\otimes$ cause polarization rotator 404 to change its rotation to maintain the polarization of the output signal 201a of POLCON 202 at the ⊗-polarization state. The leak through signal in the ⊗-state of polarization is rejected a second time at PBS2. Thus, the total rejection of the drop channel is twice the ratio $I_{PD1}/I_{PD}\otimes$.

Our Add/Drop switch 200 has two important advantages. First, the Add/Drop switch 200 may be a separate module that can be installed in a specific signal channel at the add/drop node 100 without disrupting service in the other channels. Second, Add/Drop switch 200 may be remotely re-configurable requiring a control signal 220 which specifies just one number, namely the ratio $I_{PD1}/I_{PD}\otimes$. The control signal 220 may be provided by a node computer or optical network control computer.

Additionally, our Add/Drop optical switch ensures that the polarization of the added signal is cross-polarized with respect to the leak-through optical field of the dropped signal. Because of this cross-polarization, the leak-through signal does not interfere with the added signal when the added signal is detected at a receiver. In this case, the leak-through signal only contributes to non-signal received power which leads to far smaller power penalties. Since our optical switch 200 provides a feedback signal which controls a polarization rotator 404 to maintain the drop channel signal in a fixed state of linear polarization, it thereby minimizes any leak-through signal through optical switch 200. Thus, our optical switch 200 provides the advantage of eliminating in-band crosstalk power penalties arising from interference between the optical fields of the added signal channel and the leaked-through drop signal channel. Moreover, our optical switch 200 is a modular, remotely re-configurable switch which may be used in a wavelength add/drop node of FIG. 1 to perform three required functions—namely continue-no drop, drop and continue, and drop/add.

Figure 3:
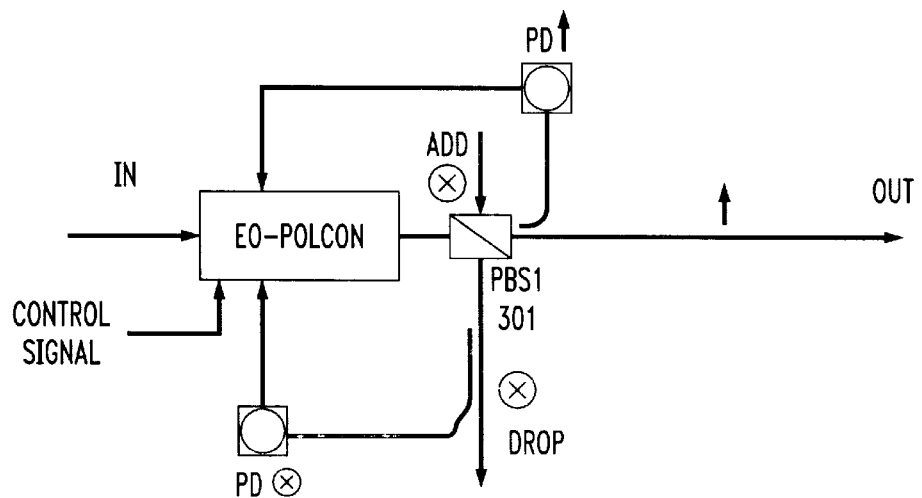
FIG. 3 shows, illustratively, a second embodiment of an Add/Drop optical switch of the Add/Drop node of FIG. 1 for controlling the Add/Drop/Continue capability for one wavelength.

Shown in FIG. 3 is an alternate Add/Drop switch 200 architecture in which a single bulk-optic PBS1 301 performs both the add and drop functions. However, this places a stringent restriction on the polarization rejection ratio of PBS1 301. If this ratio is less than 35 dB, then the dropped signal will suffer in-band crosstalk penalty due to the added signal channel.

Figure 5:
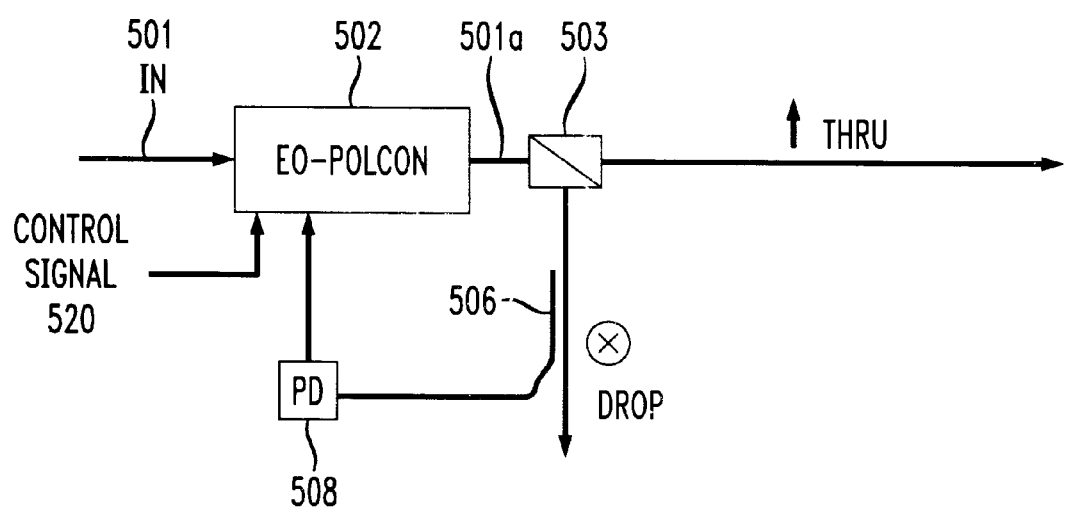
FIG. 5 shows an embodiment of an Drop/Continue optical switch apparatus.

FIG. 5 shows an embodiment of an Drop/Continue switch apparatus which is used with a fixed polarization input signal 501. Since the polarization of the input signal 501 is fixed, the feedback circuit consisting of PBS 503, coupler 506, PD 508, and POLCON 502 is connected only at predetermined times (e.g., setup time). At setup, the rotation in the polarization rotator of POLCON 502 is adjusted to obtain the desired polarization of output signal 501a (i.e., ↕-polarization state for the Continue mode, ⊗-polarization state for Drop (and Add) mode, and ↕- and ⊗-polarization states for the Drop and Continue mode).

What has been described is merely illustrative of the application of the principles of the present invention. Other methods and arrangements can be implemented by those skilled in the art without departing from the spirit and scope of the present invention.

APPENDIX

References

[1] E. L. Goldstein, L. Eskildsen and A. F. Elrefaie, "Performance implications of component crosstalk in transparent lightwave networks," IEEE Photon. Tech. Left., vol.6, no.5, pp.657–660 (1994)

[2] C. X. Yu, W-k. Wang, and S. D. Brorson, "System degradation due to multipath coherent crosstalk in WDM network nodes," J. Lightwave Tech., vol.16, no.8, pp.1380–1386 (1998)

[3] J. J. O. Pires, N. Parnis, E. Jones, and M. O'Mahony, "Crosstalk implications in full-mesh WDM ring networks using arrayed-waveguide grating OADMs," Proc. ECOC'98, pp. 541–542, Sep. 20–24, 1998, Madrid, Spain

[4] F. Heismann, "Analysis of a reset-free polarization controller for fast automatic polarization stabilization in fiber-optic transmission systems," J. Lightwave Tech., vol.12, no.4, pp.690–699

What is claimed is:

1. An optical switch apparatus arranged as an Add/Drop unit comprising a programmable optical polarization unit for receiving an input optical signal and for selecting the polarization of an output signal in response to a control signal;

a first polarization beam splitter (PBS) for splitting the selected polarization output signal from the programmable optical polarization unit into a first and second orthogonally polarized signals;

a feedback circuit for coupling a feedback signal indicative of the optical signal strength of at least one of the orthogonally polarized signals back to the programmable optical polarization unit;

wherein the programmable optical polarization unit adjusts the polarization of the selected polarization output signal in response to the feedback signal; wherein the first PBS operates as a drop unit where the first orthogonally polarized signal, produced in response to a first control signal, is outputted at a first port and the second orthogonally polarized signal, produced in response to a second control signal, is outputted at a drop port; and a second PBS having only one connection to the first PBS, that connection being from a first port of the first PBS to the first port of the second PBS so that the first orthogonally polarized signal passes to an output port of the second PBS and wherein a new second orthogonally polarized signal received at an add port of the second PBS is combined with the first orthogonally polarized signal to produce a combined output signal at the output port.

2. The optical switch apparatus of claim 1 where in response to a first control signal, the programmable optical polarization unit selects the first orthogonally polarized signal and in response to a second control signal, the programmable optical polarization unit selects the second orthogonally polarized signal.

3. The optical switch apparatus of claim 2 where in response to a third control signal, the programmable optical polarization unit selects a polarized signal that includes a portion of both the first and second orthogonally polarized signals.

4. The optical switch apparatus of claim 1 wherein the polarization of the input optical signal remains substantially constant and wherein the feedback circuit couples only one of the first and second orthogonally polarized signals to the programmable optical polarization unit.

5. The optical switch apparatus of claim 4 wherein the feedback circuit is enabled only during predetermined conditions.

6. The optical switch apparatus of claim 1 wherein the polarization of the input optical signal varies over time and wherein the feedback circuit couples both the first and second orthogonally polarized signals to the programmable optical polarization unit and wherein the programmable optical polarization unit adjusts its polarization rotation so as to maintain the selected polarization output signal at a fixed polarization.

7. The optical switch apparatus of claim 1 wherein the feedback circuit includes a coupler for coupling a portion of the first orthogonally polarized signal to a first photodetector, the photodetector generating an electrical signal in response to the coupled portion of the first orthogonally polarized signal, and wherein the programmable optical polarization unit adjusts the polarization of the selected polarization output signal in response to the electrical signal.

8. The optical switch apparatus of claim 1 wherein the feedback circuit includes a first feedback loop comprising a first coupler for coupling a portion of the first orthogonally polarized signal to a first photodetector, the first photodetector generating a first electrical signal in response to the coupled portion of the first orthogonally polarized signal;

a second feedback loop comprising a second coupler for coupling a portion of the second orthogonally polarized signal to a second photodetector, the second photodetector generating a second electrical signal in response to the coupled portion of the second orthogonally polarized signal; and wherein the programmable optical polarization unit adjusts the polarization of the selected polarization output signal in response to both the first and second electrical signals.

9. The optical switch apparatus of claim 1 wherein the programmable optical polarization unit includes a control unit responsive to the feedback signal and the control signal for generating a polarization adjust signal, and a polarization rotator circuit responsive to the polarization adjust signal for adjusting the polarization of the selected polarization output signal.

10. The optical switch apparatus of claim 1 wherein the polarization beam splitter and second polarization beam splitter are selected from a group including a prism, a thin glass plate, a partially reflective mirror, and a bulk-optic device.

11. A wavelength division multiplexed (WDM) signal Add/Drop unit including a demultiplexer for demultiplexing an input WDM signal into a plurality of output wavelength channels;

a multiplexer for multiplexing a plurality of input wavelength channels into an output WDM signal;

optical connection paths for coupling the output wavelength channels of the demultiplexer to the input wavelength channels of the multiplexer;

at least one Add/Drop unit, each Add/Drop unit connected in series with a different optical connection path between an output wavelength channel and an input wavelength channel, and wherein the drop port of a first polarization beam splitter (PBS) is used to drop a wavelength channel of the input WDM signal in response to a separate control signal received at that Add/Drop unit and wherein the add port of a second PBS is used to add a wavelength channel to the output WDM signal; and wherein the at least one Add/Drop unit includes a programmable optical polarization unit for receiving a wavelength channel of the input WDM signal and for selecting the polarization of an output signal in response to the control signal;

the first PBS operated as a drop unit for splitting the selected polarization output signal from the programmable optical polarization unit into a first orthogonally polarized signal which is outputted at a first port and a second orthogonally polarized signal which is outputted at the drop port;

the second PBS is connected to receive the first orthogonally polarized signal at a first port and an add second orthogonally polarized signal at an add port and for producing a wavelength channel of the output WDM signal;

a feedback circuit for coupling a feedback signal indicative of the optical signal strength of at least one of the first and second orthogonally polarized signals back to the programmable optical polarization unit;

wherein the programmable optical polarization unit adjusts the polarization of the selected polarization output signal in response to the feedback signal; and where in response to a first control signal, the programmable optical polarization unit selects the first orthogonally polarized signal and in response to a second control signal, the programmable optical polarization unit selects the second orthogonally polarized signal.

12. The wavelength division multiplexed (WDM) signal Add/Drop unit of claim 11 wherein the first PBS and second PBS are selected from a group including a prism, a thin glass plate, a partially reflective mirror, and a bulk-optic device.

13. A wavelength division multiplexed (WDM) signal Add/Drop unit including a demultiplexer for demultiplexing an input WDM signal into a plurality of output wavelength channels;

a multiplexer for multiplexing a plurality of input wavelength channels into an output WDM signal;

optical connection paths for coupling the output wavelength channels of the demultiplexer to the input wavelength channels of the multiplexer;

at least one Add/Drop unit, each Add/Drop unit connected in series with a different optical connection path between an output wavelength channel and an input wavelength channel, and wherein the at least one Add/Drop unit includes a programmable optical polarization unit for receiving a wavelength channel of the input WDM signal and for selecting the polarization of an output signal in response to said control signal;

a polarization beam splitter (PBS) for splitting the selected polarization output signal from the programmable optical polarization unit into a first and second orthogonally polarized signals; wherein the polarization beam splitter is a bulk-optics device which includes four ports and provides an Add/Drop function, where the first orthogonally polarized signal is outputted at a first port in response to a first control signal, the second orthogonally polarized signal is outputted at a drop port in response to a second control signal;

a feedback circuit for coupling a feedback signal indicative of the optical signal strength of at least one of the first and second orthogonally polarized signals back to the programmable optical polarization unit;

wherein the programmable optical polarization unit adjusts the polarization of the selected polarization output signal in response to the feedback signal; and where in response to the first control signal, the programmable optical polarization unit selects the first orthogonally polarized signal to be outputted at the first port and in response to the second control signal, the programmable optical polarization unit selects the second orthogonally polarized signal to be outputted at the drop port, and an added second orthogonally polarized signal received at an add port of the bulk-optics device is combined in the bulk-optics device to produce a combined output signal at a fourth port of the bulk-optics device.

* * * * *